US012800809B2

(12) United States Patent
Johnson et al.

(10) Patent No.: US 12,800,809 B2
(45) Date of Patent: Nov. 17, 2026

(54) MULTILAYER OPTICAL FILM

(71) Applicant: 3M INNOVATIVE PROPERTIES COMPANY, St. Paul, MN (US)

(72) Inventors: Matthew B. Johnson, Woodbury, MN (US); Gilles J. Benoit, Minneapolis, MN (US); Lin Zhao, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 175 days.

(21) Appl. No.: 18/709,846

(22) PCT Filed: Nov. 14, 2022

(86) PCT No.: PCT/IB2022/060939
§ 371 (c)(1),
(2) Date: May 14, 2024

(87) PCT Pub. No.: WO2023/099998
PCT Pub. Date: Jun. 8, 2023

(65) Prior Publication Data

US 2024/0411070 A1 Dec. 12, 2024

Related U.S. Application Data

(60) Provisional application No. 63/284,760, filed on Dec. 1, 2021.

(51) Int. Cl.
*G02B 5/20* (2006.01)
*G02B 5/26* (2006.01)
(Continued)

(52) U.S. Cl.
CPC ............... *G02B 5/208* (2013.01); *G02B 5/26* (2013.01); *G02B 5/282* (2013.01); *G02B 5/287* (2013.01);
(Continued)

(58) Field of Classification Search
CPC .......... G02B 5/208; G02B 5/26; G02B 5/287; G02B 5/282; G02B 5/3041; G02B 5/305; G02B 5/3066
See application file for complete search history.

(56) References Cited

U.S. PATENT DOCUMENTS 5,103,337 A 4/1992 Schrenk et al.
5,540,978 A 7/1996 Schrenk
(Continued)

OTHER PUBLICATIONS

International Search Report for PCT International Application No. PCT/IB2022/060939, mailed on Jan. 31, 2023, 3 pages.

*Primary Examiner* — Angela M. Medich
(74) *Attorney, Agent, or Firm* — Clifton F. Richardson; Theresa Stadheim

(57) ABSTRACT

A multilayer optical film includes a plurality of optical repeat units, each including at least four layers. For an incident angle of less than about 10 degrees and for p- and s-polarizations, the plurality of optical repeat units has respective average optical reflectances Rpv and Rsv in a visible wavelength range and respective average optical reflectances Rpi and Rsi in an infrared wavelength range, where Rpi/Rpv<Rsi/Rsv; and for the s-polarization, for at least one wavelength in the infrared wavelength range, and for incident angle first, second and third ranges where the incident angles in the second range are greater than the incident angles in the first range and smaller than the incident angles in the third range, the plurality of optical repeat units has respective average optical reflectances Rs1, Rs2 and Rs3, where Rs3>Rs2>Rs1.

7 Claims, 9 Drawing Sheets

(51) Int. Cl.
*G02B 5/28* (2006.01)
*G02B 5/30* (2006.01)

(52) U.S. Cl.
CPC ............ *G02B 5/3041* (2013.01); *G02B 5/305* (2013.01); *G02B 5/3066* (2013.01)

(56) References Cited

U.S. PATENT DOCUMENTS

| | | | |
|---|---|---|---|
| 5,882,774 | A | 3/1999 | Jonza et al. |
| 6,157,490 | A | 12/2000 | Wheatley et al. |
| 6,179,948 | B1 | 1/2001 | Merrill et al. |
| 6,207,260 | B1 | 3/2001 | Wheatley et al. |
| 6,783,349 | B2 | 8/2004 | Neavin et al. |
| 6,949,212 | B2 | 9/2005 | Merrill et al. |
| 6,967,778 | B1 | 11/2005 | Wheatley et al. |
| 8,854,730 | B2 | 10/2014 | Wang et al. |
| 9,069,136 | B2 | 6/2015 | Weber et al. |
| 9,162,406 | B2 | 10/2015 | Neavin et al. |
| 9,477,011 | B2 | 10/2016 | Liu et al. |
| 10,001,587 | B2 | 6/2018 | Liu |
| 2001/0009714 | A1 | 7/2001 | Wheatley et al. |
| 2021/0302637 | A1 | 9/2021 | Haag et al. |

MULTILAYER OPTICAL FILM

CROSS REFERENCE TO RELATED APPLICATIONS

This application is a national stage filing under 35 U.S.C. 371 of PCT/IB2022/060939, filed Nov. 14, 2022, which claims the benefit of U.S. Application No. 63/284,760, filed Dec. 1, 2021, the disclosures of which are incorporated by reference in their entireties herein.

SUMMARY

In some aspects, the present description provides a multilayer optical film including a plurality of optical repeat units. Each of the optical repeat units includes at least one polymeric A layer, at least two polymeric B layers, and at least one polymeric C layer. Each pair of adjacent A and C layers has at least one of the at least two B layers disposed therebetween. A total number of the A, B and C layers in the plurality of optical repeat units can be greater than about 400. Each of the A, B and C layers can have an average thickness of less than about 500 nm, such that for an incident light propagating in an incident plane that makes an angle of less than about 10 degrees with an in-plane first direction of the optical film, a visible wavelength range extending from about 420 nm to about 680 nm, and an infrared wavelength range extending from about 900 nm to about 1300 nm: for an incident angle of less than about 10 degrees and for p- and s-polarizations, the plurality of optical repeat units has respective average optical reflectances Rpv and Rsv in the visible wavelength range and respective average optical reflectances Rpi and Rsi in the infrared wavelength range, where Rpi/Rpv<Rsi/Rsv; and for the s-polarization, for at least one wavelength in the infrared wavelength range, and for incident angle first, second and third ranges that are at least 10 degrees apart and where each of the incident angle ranges is at least 5 degrees wide and the incident angles in the second range are greater than the incident angles in the first range and smaller than the incident angles in the third range, the plurality of optical repeat units has respective average optical reflectances Rs1, Rs2 and Rs3, where Rs3>Rs2>Rs1.

In some aspects, the present description provides a multilayer optical film including a plurality of optical repeat units. Each of the optical repeat units includes at least one polymeric A layer, at least two polymeric B layers, and at least one polymeric C layer. Each pair of adjacent A and C layers has at least one of the at least two B layers disposed therebetween. A total number of the A, B and C layers in the plurality of optical repeat units can be greater than about 400. Each of the A, B and C layers can have an average thickness of less than about 500 nm, such that for an incident light propagating in an incident plane that makes an angle of less than about 10 degrees with an in-plane first direction of the optical film: for a visible wavelength range extending from about 420 nm to about 680 nm, and for an incident angle of less than about 10 degrees, the plurality of optical repeat units has respective average optical reflectances Rpv and Rsv for respective p- and s-polarizations, where Rpv/Rsv≥2; and for at least one wavelength in an infrared wavelength range extending from about 900 nm to about 1300 nm, and for incident angle first, second and third ranges that are at least 10 degrees apart and where each of the incident angle ranges is at least 5 degrees wide and the incident angles in the second range are greater than the incident angles in the first range and smaller than the incident angles in the third range, the plurality of optical repeat units has respective average optical reflectances Rs1, Rs2 and Rs3 for the s-polarization and respective average optical reflectances Rp1, Rp2 and Rp3 for the p-polarization, where: a magnitude of a maximum difference between Rp1, Rp2 and Rp3 is less than about 20%; Rs3>Rs2>Rs1; and Rs3 is greater than Rs1 by at least 20%.

In some aspects, the present description provides a multilayer optical film including a plurality of optical repeat units numbering at least 50 in total. Each of the optical repeat units includes at least four individual layers. Two of the individual layers in the at least four individual layers are substantially optically isotropic and have smaller average thicknesses than at least two other of the individual layers in the at least four individual layers. One of the individual layers in the at least four individual layers can have indices of refraction A(nx) and A(ny) along respective in-plane orthogonal x- and y-directions, where for at least one wavelength in a visible wavelength range extending from about 420 nm to about 680 nm, A(nx) can be greater than A(ny) by at least 0.12, such that for an incident light propagating in an incident plane that makes an angle of between about 30 degrees and about 60 degrees with the in-plane x-direction of the optical film, and incident angle first, second and third ranges that are at least 10 degrees apart and where each of the incident angle ranges is at least 5 degrees wide and the incident angles in the second range are greater than the incident angles in the first range and smaller than the incident angles in the third range, and for at least one wavelength in an infrared wavelength range extending from about 900 nm to about 1300 nm, the plurality of optical repeat units has respective average optical reflectances Ss1, Ss2 and Ss3 when the incident light is s-polarized, where Ss3>Ss2>Ss1.

In some aspects, the present description provides a multilayer optical film including a plurality of optical repeat units. Each of the optical repeat units includes at least one polymeric A layer, at least two polymeric B layers, and at least one polymeric C layer, where each pair of adjacent A and C layers have at least one of the at least two B layers disposed therebetween. A total number of the A, B and C layers in the plurality of optical repeat units can be greater than about 400. Each of the A, B and C layers can have an average thickness of less than about 500 nm. The A layers can have indices of refraction A(nx) and A(ny) along respective in-plane orthogonal x- and y-directions, where for at least one wavelength in a visible wavelength range extending from about 420 nm to about 680 nm, A(nx) can be greater than A(ny) by at least 0.12, such that for an incident light propagating in an incident plane that makes an angle of between about 30 degrees and about 60 degrees with the in-plane x-direction of the optical film, and incident angle first and second ranges that are at least 30 degrees apart and where each of the incident angle ranges is at least 5 degrees wide and the incident angles in the second range are greater than the incident angles in the first range, and for at least one wavelength in an infrared wavelength range extending from about 900 nm to about 1300 nm, the plurality of optical repeat units has respective average optical reflectances Ss1 and Ss2 when the incident light is s-polarized, and respective average optical reflectances Sp1 and Sp2 when the incident light is p-polarized, where Ss2/Ss1>Sp2/Sp1.

In some aspects, the present description provides a multilayer optical film including a plurality of optical repeat units. Each of the optical repeat units includes at least one polymeric A layer, at least two polymeric B layers, and at least one polymeric C layer, where each pair of adjacent A and C layers has at least one of the at least two B layers disposed therebetween. A total number of the A, B and C layers in the plurality of optical repeat units can be greater than about 400. Each of the A, B and C layers can have an average thickness of less than about 500 nm. The A layers can have indices of refraction A(nx) and A(ny) along respective in-plane orthogonal x- and y-directions, where for at least one wavelength in a visible wavelength range extending from about 420 nm to about 680 nm, A(nx) can be greater than A(ny) by at least 0.12, such that for an incident light propagating in an incident plane that makes an angle of between about 30 degrees and about 60 degrees with the in-plane x-direction of the optical film, and incident angle first and second ranges that are at least 30 degrees apart and where each of the incident angle ranges is at least 5 degrees wide and the incident angles in the second range are greater than the incident angles in the first range, and for an infrared wavelength range that is at least 5 nm wide and is disposed between about 700 nm and about 1400 nm, the plurality of optical repeat units has respective average optical reflectances S's1 and S's2 when the incident light is s-polarized, and respective average optical reflectances S'p1 and S'p2 when the incident light is p-polarized, where S's2/S's1>S'p2/S'p1.

In some aspects, the present description provides a multilayer optical film including a plurality of optical repeat units. Each of the optical repeat units includes at least one polymeric A layer, at least two polymeric B layers, and at least one polymeric C layer, where each pair of adjacent A and C layers having at least one of the at least two B layers disposed therebetween. A total number of the A, B and C layers in the plurality of optical repeat units can be greater than about 400. Each of the A, B and C layers can have an average thickness of less than about 500 nm. The A layers can have indices of refraction A(nx) and A(ny) along respective in-plane orthogonal x- and y-directions, where for at least one wavelength in a visible wavelength range extending from about 420 nm to about 680 nm, A(nx) can be greater than A(ny) by at least 0.12, such that for an incident light propagating in an incident plane that makes an angle of between about 30 degrees and about 60 degrees with the in-plane x-direction of the optical film, and incident angle first and second ranges that are at least 30 degrees apart and where each of the incident angle ranges is at least 5 degrees wide and the incident angles in the second range are greater than the incident angles in the first range: for the incident angle first range and the visible wavelength range, the plurality of optical repeat units has average optical reflectances Ps1 and Pp1 for the respective s- and p-polarization, where each of Ps1 and Ps2 greater than about 5%; and for an infrared wavelength range that is at least 5 nm wide and is disposed between about 700 nm and about 1400 nm, and for the incident angle first and second ranges, the plurality of optical repeat units has respective average optical reflectances Ps2 and Qs2 for one of the s- and p-polarizations, and respective average optical reflectances Pp2 and Qp2 for the other one of the s- and p-polarizations, where Qs2−Ps2>Qp2−Pp2.

These and other aspects will be apparent from the following detailed description. In no event, however, should this brief summary be construed to limit the claimable subject matter.

DETAILED DESCRIPTION

Figure 1:
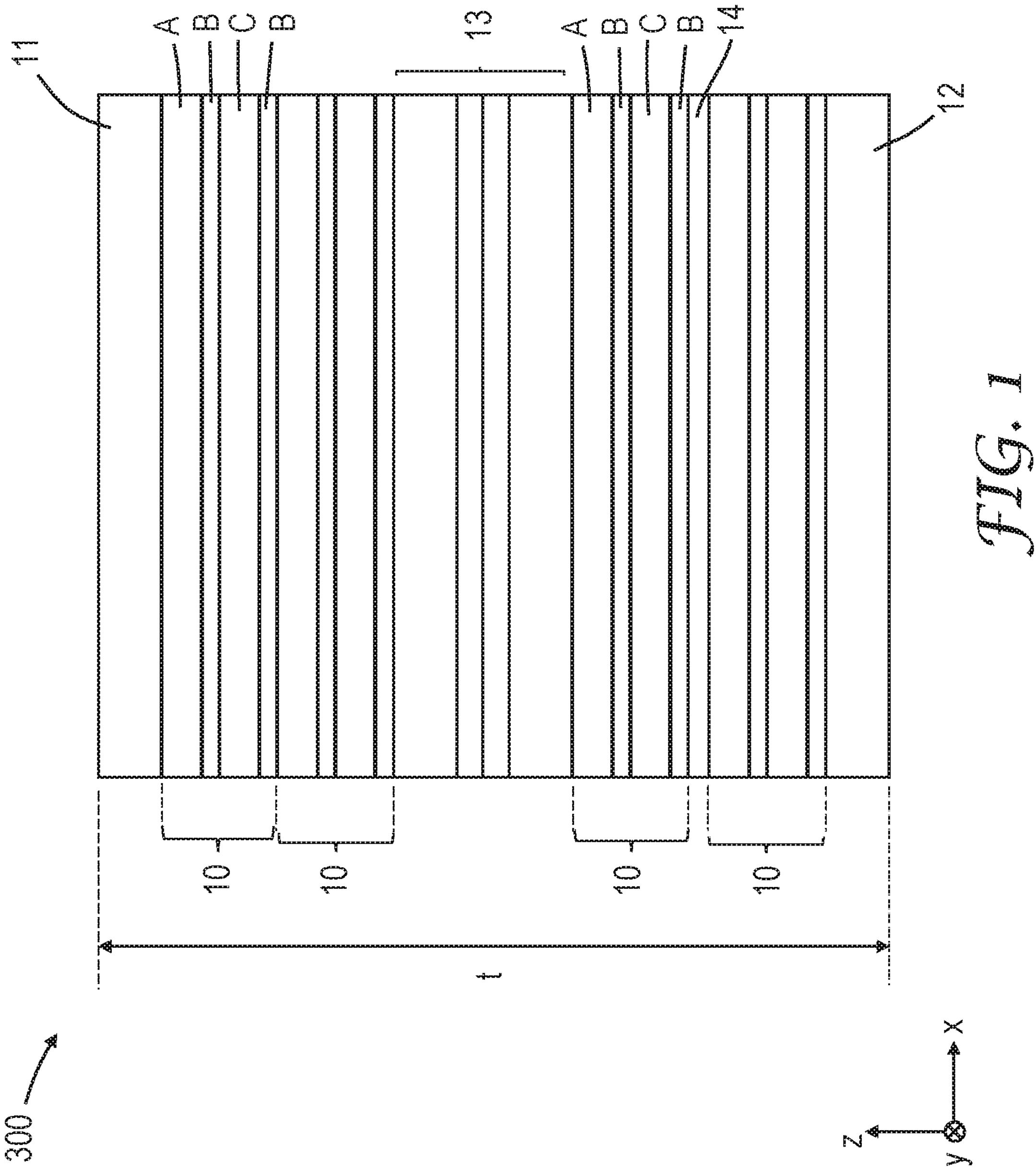
FIG. 1 is a schematic cross-sectional view of a multilayer optical film, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films including alternating polymeric layers can be used to provide desired reflection and transmission in desired wavelength ranges by suitable selection of layer thicknesses and refractive index differences. Multilayer optical films and methods of making multilayer optical films are described in U.S. Pat. No. 5,103,337 (Schrenk et al.); U.S. Pat. No. 5,540,978 (Schrenk); U.S. Pat. No. 5,882,774 (Jonza et al.); U.S. Pat. No. 6,179,948 (Merrill et al.); U.S. Pat. No. 6,207,260 (Wheatley et al.); U.S. Pat. No. 6,783,349 (Neavin et al.); U.S. Pat. No. 6,949,212 (Merrill et al.); U.S. Pat. No. 6,967,778 (Wheatley et al.); and U.S. Pat. No. 9,162,406 (Neavin et al.), for example.

According to some embodiments of the present description, multilayer optical films having a desired distribution of reflectivity with incident angle are provided. In some embodiments, the optical film can have a reflectance for at least one infrared wavelength, or for an infrared wavelength range, that generally increases with increasing incidence angle for an s-polarization state while having a substantially smaller change with incidence angle for a p-polarization state. Because p-polarization bands generally shift faster than s-polarization bands, a wide band can be utilized to achieve the desired angular response for all desired incident angles. It has been found that it is difficult to achieve the desired bandwidth without third order harmonics undesirably appearing in the blue wavelength range when a two-layer optical repeat unit is utilized. However, according to some embodiments, it has been found that including a plurality of optical repeat units that each include four or more layers can be utilized to provide the desired bandwidth and the desired angular response. For example, each optical repeat unit can include at least one polymeric A layer, at least two polymeric B layers, and at least one polymeric C layer. An optical repeat unit is generally the smallest distinct unit of optical layers that repeats along a thickness direction of the optical film where optical layers are layers that transmit and reflect light primarily by optical interference and typically have an average thickness less than about 500 nm. In some embodiments, the optical film is substantially more transmissive in a visible wavelength range than in an infrared wavelength range. For example, the optical film may be used primarily for controlling infrared light transmission while being substantially transmissive to visible light. The optical films according to some embodiments may be useful in consumer electronics, automotive applications, heat mitigation applications, and/or eye tracking applications. Ranges for reflectances (or ratios of different reflectances) for various incidence angles, for various wavelengths or wavelengths ranges, and for various polarization states that are useful for various applications are described elsewhere herein.

FIG. 1 is a schematic cross-sectional view of a multilayer optical film 300, according to some embodiments. The multilayer optical film includes a plurality of optical repeat units 10. In some embodiments, each of the optical repeat units 10 include at least one polymeric A layer, at least two polymeric B layers, and at least one polymeric C layer, where each pair of adjacent A and C layers have at least one of the at least two B layers disposed therebetween. In some embodiments, a total number of the A, B and C layers in the plurality of optical repeat units is greater than about 400, 600, 800, 1000, 1100, or 1200. The total number of the A, B and C layers can be up to about 10000, 5000, or 4000, for example. In some embodiments, the plurality of optical repeat units 10 number at least 50, 100, 150, 200, 250, 300, 350, or 400 in total. The total number of optical repeat units 10 can be up to 1000, 800, or 600, for example. In some embodiments, each of the optical repeat units 10 include at least four individual layers (e.g., A, B, C, B), where two of the individual layers (e.g., B, B) in the at least four individual layers are substantially optically isotropic and have smaller average thicknesses than at least two other of the individual layers (e.g., A, C) in the at least four individual layers. In some embodiments, each of the optical repeat units 10 include only four individual layers. The optical film 300 can include skin layers 11 and 12 and optional other layer(s) 13 and 14.

Figure 2:
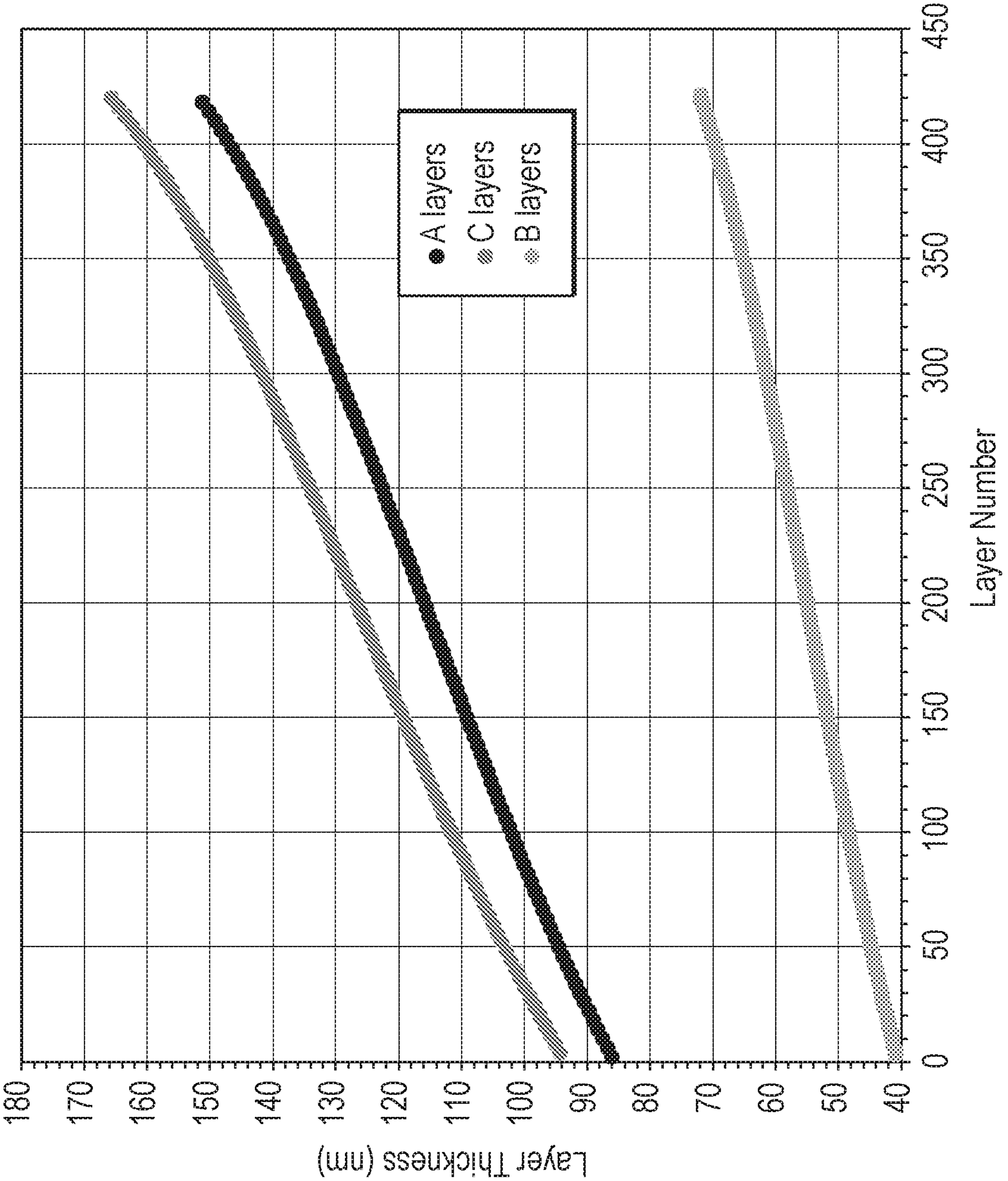
FIG. 2 is a plot of layer thicknesses of A, B, and C layers in a multilayer optical film, according to some embodiments.

FIG. 2 is a plot of exemplary layer thicknesses of A, B, and C layers in a multilayer optical film. In some embodiments, each of the A, B and C layers have an average thickness of less than about 500, 450, 400, 350, 300, 250, or 200 nm. Each of the A, B and C layers have an average thickness of greater than about 20, 25, or 30 nm, for example. In some embodiments, for each of the optical repeat units 10, each of the B layers has an average thickness in a range of about 20 to 80 nm and each of the A and C layers has an average thickness in a range of about 80 to 180 nm. In some embodiments, for each of the optical repeat units 10, the average thickness of each of the at least two polymeric B layers is less than the average thickness of the at least one polymeric A layer and the average thickness of each of the at least one polymeric C layer. In some embodiments, for each of the optical repeat units 10, the average thickness of each of the at least two polymeric B layers is less than 0.8 times the average thickness of the at least one polymeric A layer and less than 0.8 times the average thickness of each of the at least one polymeric C layer. In some embodiments, for each of the optical repeat units 10, the average thickness of each of the at least two polymeric B layers is less than 0.6 times the average thickness of the at least one polymeric A layer and less than 0.6 times the average thickness of each of the at least one polymeric C layer.

In some embodiments, the plurality of optical repeat units 10 is disposed between first and second skin layers 11 and 12, where each of the first and second skin layers has an average thickness of greater than about 500, 600, 750, 1000, 1250, or 1500 nm. The average thickness of the skin layers may be up to about 50, 40, 30, 20, 15, or 10 micrometers, for example. Optional layer(s) 13 may include one or more protective boundary layer, each having an average thickness in any of the ranges described for the skin layers 11, 12 and may optionally include one or more layers that each have an average thickness in any of the ranges described for any of the A, B, or C layers. The optical film 300 may optionally include additional layer(s) 14 which may be disposed between adjacent optical repeat units 10 and which may have an average thickness in any of the ranges described for any of the A, B, or C layers The optical film 300 extends along orthogonal in-plane x- and y-directions and has a thickness in a z-direction orthogonal to the x- and y-directions. In-plane directions of a film generally refer to directions (x- and y-directions) in the plane (xy-plane) defined by the film. In some embodiments, the multilayer optical film 300 can have an average thickness t in a range of about 10 to 200 micrometers or about 20 to 150 micrometers. In some embodiments, the optical film has a higher reflectance for substantially normally incident light when the light is polarized along the x-axis than when the light is polarized along the y-axis.

In some embodiments, at least one layer of the optical repeat unit 10 is birefringent and has a maximum index of refraction along an in-plane x-direction. In some embodiments, one of the individual layers (e.g., A) in the at least four individual layers has indices of refraction A(nx) and A(ny) along respective in-plane orthogonal x- and y-directions, where for at least one wavelength 30 (e.g., about 630 nm) in a visible wavelength range 22 extending from about 420 nm to about 680 nm, A(nx) is greater than A(ny) by at least 0.12, or 0.13, or 0.14, or 0.15, or 0.16, or 0.17, or 0.18, or 0.19. A(nx) can be greater than A(ny) by up to 0.4, or 0.35, or 0.3, or 0.25, for example. In some embodiments, the one of the individual layers has a maximum in-plane index of refraction along the in-plane x-direction. In some embodiments, the one of the individual layers (e.g., A) in the at least four individual layers further has an index of refraction A(nz) along a z-direction orthogonal to the x- and y-directions, where for the at least one wavelength, A(ny) is greater than A(nz) by at least 0.05, 0.06, 0.07, 0.08, 0.09, 0.10, or 0.11. A(ny) can be greater than A(nz) by up to 0.3, or 0.25, or 0.2, or 0.15, for example. In some embodiments, each optical repeat unit includes at least four individual layers and two of the individual layers (e.g., C, C), or at least two of the individual layers (e.g., C, C, B) in the at least four individual layers are substantially optically isotropic. A substantially optically isotropic layer can have a maximum difference in refractive indices for the at least one wavelength that is less than 0.05, 0.04, 0.03, 0.02, or 0.01, for example.

Figure 3:
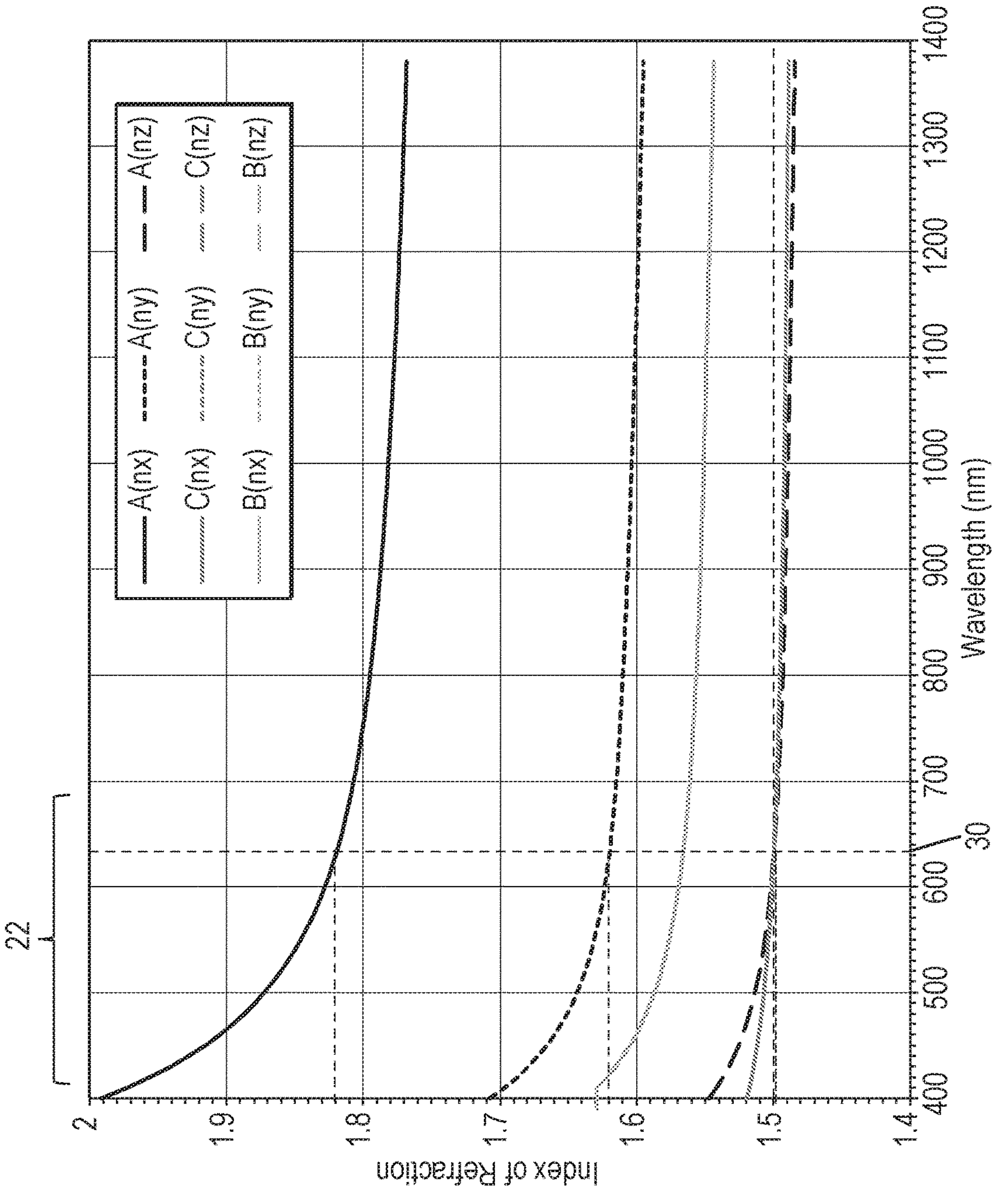
FIG. 3 is a plot of indices of refraction as a function of wavelength for A, B, and C layers in a multilayer optical film, according to some embodiments.

FIG. 3 is a plot of exemplary indices of refraction as a function of wavelength for A, B, and C layers in a multilayer optical film. A(nx), A(ny), and A(nz) denote the index of refraction of the A layers along the x-, y-, and z-directions, respectively. Similarly, B(nx), B(ny), B(nz) and C(nx), C(ny), C(nz) denote the indices of refraction of the B and C layers along the x-, y-, and z-directions. Suitable refractive indices can be selected by suitably selecting the materials for the various layers.

Suitable materials for the various layers in the multilayer optical film 300 include, for example, polyethylene naphthalate (PEN), coPEN (copolyethylene naphthalate terephthalate copolymer), polyethylene terephthalate (PET), polyhexylethylene naphthalate copolymer (PHEN), syndiotactic polystyrene (sPS), glycol-modified PET (PETG), glycol-modified PEN (PENG), coPET-polycarbonate alloys, various other copolyesters such as those described elsewhere herein, polyolefins, polymethyl methacrylate (PMMA), coPMMA (a copolymer of methyl methacrylate and ethyl acrylate), other acrylics, or blends thereof. Other suitable materials for the various layers in the multilayer optical film 300 include those described in U.S. Pat. No. 5,103,337 (Schrenk et al.); U.S. Pat. No. 5,540,978 (Schrenk); U.S. Pat. No. 5,882,774 (Jonza et al.); U.S. Pat. No. 6,179,948 (Merrill et al.); U.S. Pat. No. 6,207,260 (Wheatley et al.); U.S. Pat. No. 6,783,349 (Neavin et al.); U.S. Pat. No. 6,967,778 (Wheatley et al.); U.S. Pat. No. 9,069,136 (Weber et al.); and U.S. Pat. No. 9,162,406 (Neavin et al.), for example. The refractive indices illustrated in FIG. 3 are for PEN (A layers), PETG (B layers), and PMMA (C layers).

Suitable sPS can be obtained from Idemitsu Kosan Co., Ltd. (Tokyo, Japan), for example. Atactic polystyrene (aPS) can optionally be blended with sPS (e.g., at about 5 to about 30 weight percent aPS) to adjust the refractive indices of the resulting layer and/or to reduce the haze of the layer (e.g., by reducing a crystallinity of the layer). Suitable PMMA can be obtained from Arkema Inc., Philadelphia, PA., for example. Suitable PET can be obtained from Nan Ya Plastics Corporation, America (Lake City, SC), for example. PETG can be described as PET with some of the glycol units of the polymer replaced with different monomer units, typically those derived from cyclohexanedimethanol. PETG can be made by replacing a portion of the ethylene glycol (e.g., about 15 to about 60 mole percent or about 30 to about 40 mole percent) used in the transesterification reaction producing the polyester with cyclohexanedimethanol, for example. Suitable PETG copolyesters include GN071 available from Eastman Chemical Company (Kingsport, TN). PEN and coPEN can be made as described in U.S. Pat. No. 10,001,587 (Liu), for example. Glycol-modified polyethylene naphthalate (PENG) can be described as PEN with some of the glycol units of the polymer replaced with different monomer units and can be made by replacing a portion of the ethylene glycol (e.g., about 15 to about 60 mole percent or about 30 to about 40 mole percent) used in the transesterification reaction producing the polyester with cyclohexanedimethanol, for example. PHEN can be made as described for PEN in U.S. Pat. No. 10,001,587 (Liu), for example, except that a portion of the ethylene glycol (e.g., about 15 to about 60 mole percent, or about 30 to about 50 mole percent, or about 40 mole percent) used in the transesterification reaction is replaced with hexanediol. Other suitable copolyesters include those available under the TRITAN tradename from Eastman Chemical Company (Kingsport, TN) and OKP-1 available from Osaka Gas Chemicals Co., Ltd. (Osaka, Japan), for example.

A copolyester may include aromatic and aliphatic groups. Refractive indices of such copolyesters can be adjusted by suitable selection of the types and amounts of the aromatic and aliphatic groups. For example, reducing the aromatic content of a copolyester generally reduces the overall refractive index of the copolyester and the birefringence of an oriented layer of the copolyester. As another example, using aromatic groups including two fused aromatic rings (e.g., as in PEN) gives a higher birefringence after orientation than using aromatic groups having a single aromatic ring (e.g., as in PET). As still another example, incorporating stilbene groups has been found to generally increase refractive indices and birefringence. As yet another example, replacing a portion of dimethyl terephthalate or terephthalic acid in PET with dimethyl cyclohexanedicarboxylate, which replaces an aromatic ring with an aliphatic ring, generally reduces birefringence. Related useful copolyesters are described in U.S. Pat. No. 9,477,011 (Liu et al.), for example.

In some embodiments, the A layers are birefringent and at least one of the B and C layers are substantially optically isotropic. In some embodiments, each of the B and C layers are substantially optically isotropic. PEN, PET, sPS and TRITAN copolyesters are examples of birefringent thermoplastic polymers (when suitably oriented), while PETG, PMMA, and coPMMA are examples of substantially optically isotropic thermoplastic polymers. Further examples of birefringent thermoplastic polymers and of substantially isotropic thermoplastic polymers, are described in U.S. Pat. No. 8,854,730 (Wang et al.) and U.S. Pat. No. 9,069,136 (Weber et al.), for example.

Figure 4A:
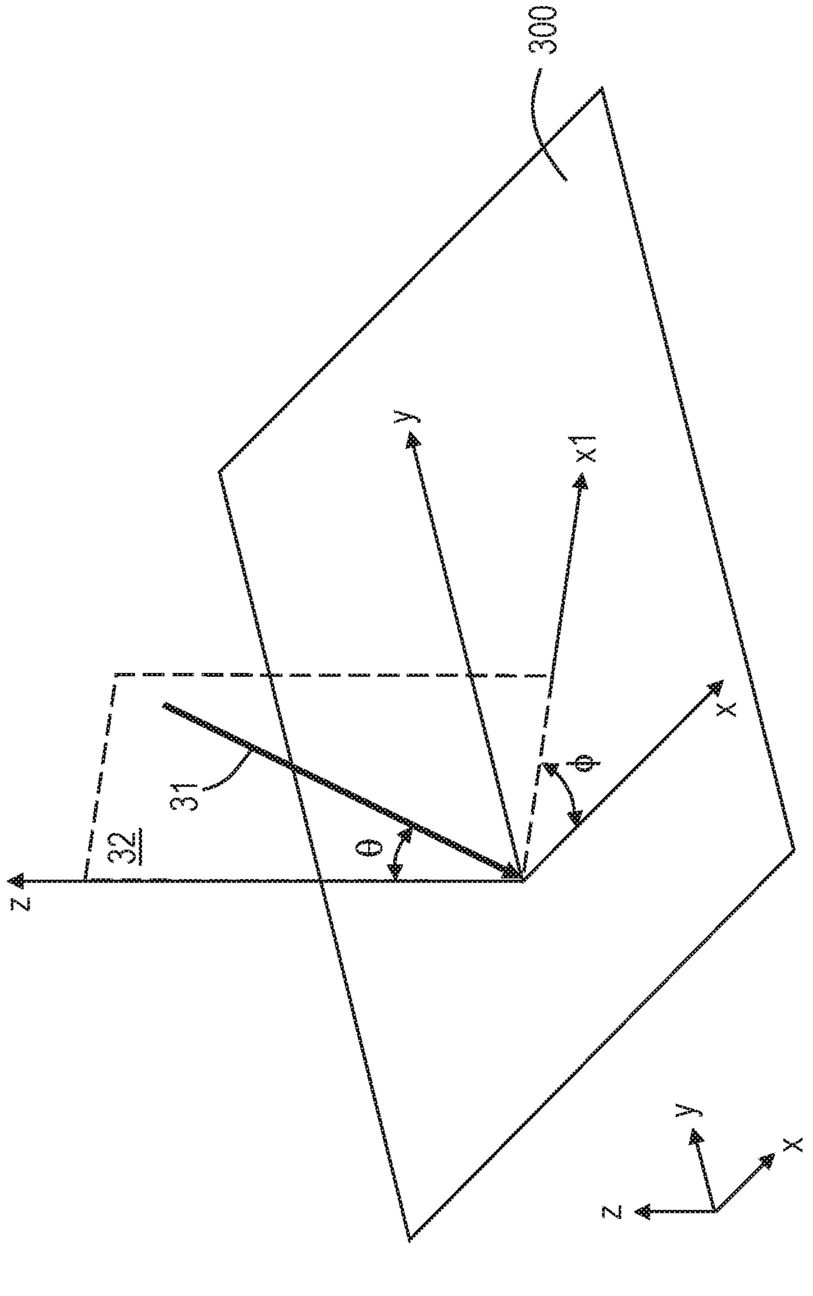
FIG. 4A is a schematic perspective view of a light incident on an optical film.
Figure 4C:
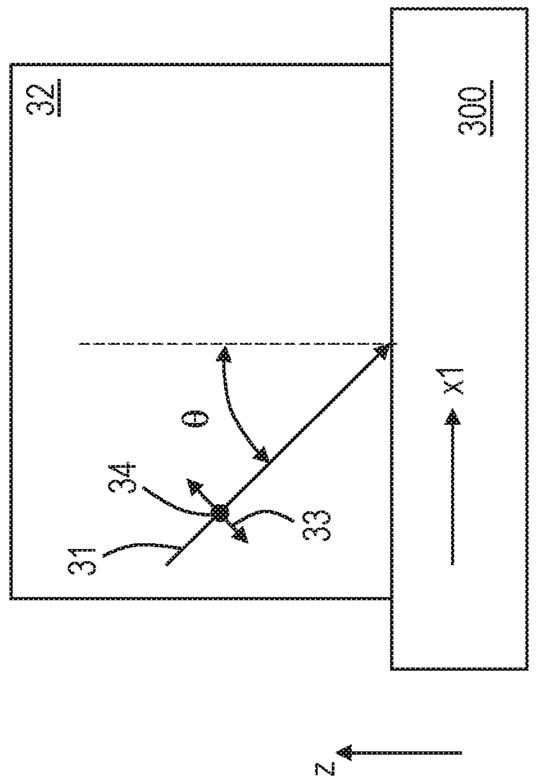
FIG. 4C is a schematic cross-sectional view of light incident on an optical film in an incident plane parallel to an x1-direction.
Figure 4B:
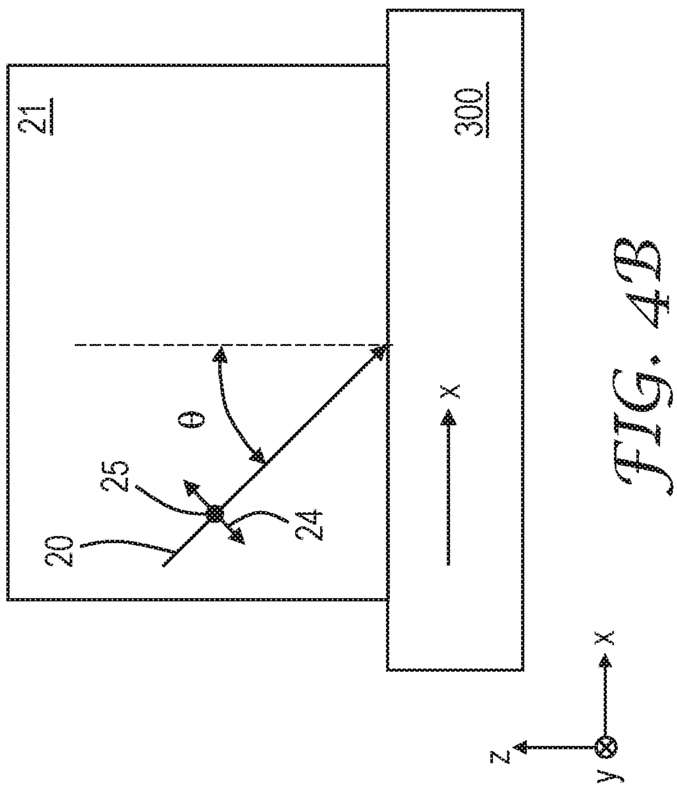
FIG. 4B is a schematic cross-sectional view of a light incident on an optical film in an incident plane parallel to an x-direction.

FIG. 4A is a schematic perspective view of a light 31 incident on a multilayer optical film 300 at an incident angle θ (angle between light 31 and the normal (z-axis) to the film). FIG. 4B is a schematic cross-sectional view of a light 20 incident on the optical film 300 in an incident plane 21 parallel to the x-direction. P- and s-polarization states 24 and 25 are illustrated. FIG. 4C is a schematic cross-sectional view of light 31 incident on the optical film 300 in an incident plane 32 parallel to an in-plane x1-direction which makes an angle φ with the x-direction (see, e.g., FIG. 4A). P- and s-polarization states 33 and 34 are illustrated.

Figure 5:
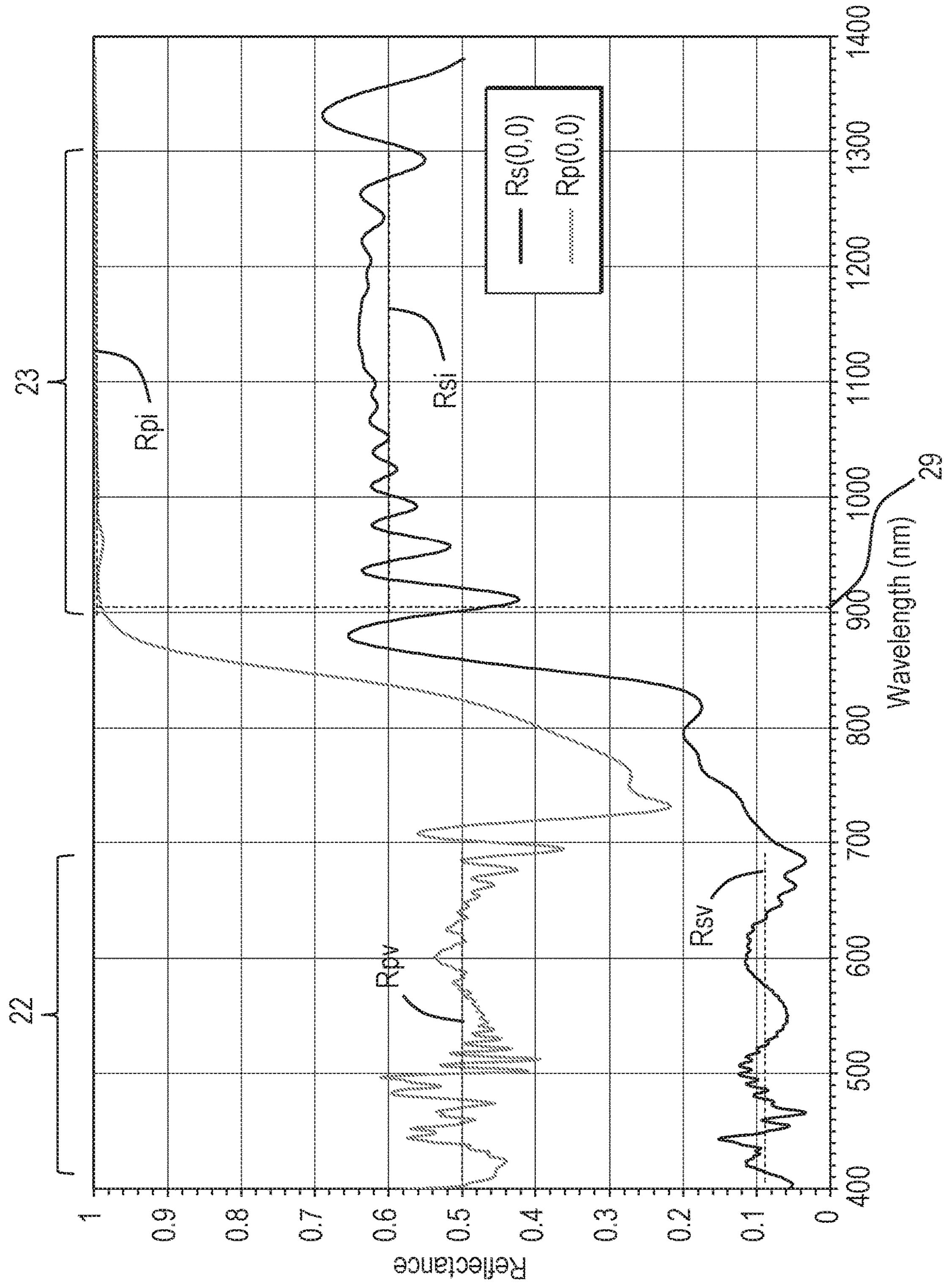
FIG. 5 is a plot of reflectance versus wavelength for substantially normally incident light on a multilayer optical film, according to some embodiments.

FIG. 5 is a plot of reflectance versus wavelength for substantially normally incident (e.g., incident angle θ less than about 10 degrees) light on an exemplary multilayer optical film. Rs(0,0) is the reflectance for the s-polarization state 25 in the incident plane 21 and Rp(0,0) is the reflectance for the p-polarization state 24 in the incident plane 21. More generally, the notation Rp(θ, φ) and Rs(θ, φ) refers to the reflectance for p- and s-polarization states for an incident angle θ in an incident plane at an angle φ relative to the x-direction. Average reflectances for p- and s-polarizations states 24 and 25 are denoted Rpv and Rsv, respectively, for a visible wavelength range 22 and Rpi and Rsi, respectively, for an infrared wavelength range 23. In some embodiments, Rpi/Rpv<Rsi/Rsv. In some embodiments, Rpi/Rpv<0.9, 0.8, 0.7, 0.6, 0.5, or 0.4 times Rsi/Rsv. In some embodiments, Rsi/Rsv is less than 25, 20, 15, or 10, for example. In some embodiments, Rpv/Rsv≥2. In some embodiments, Rpv/Rsv is at least 2.5, 3, 3.5, 4, 4.5, 5, or 5.5. Rpv/Rsv can be up to 20, 15, 10, 8, or 6, for example. In some embodiments, Rpv is in a range of 30 to 70 percent or 40 to 60 percent. In some such embodiments, or in other embodiments, Rsv is in a range of 2 to 20 percent or 4 to 18 percent. In some such embodiments, or in other embodiments, Rsi is in a range of 40 to 80 percent or 50 to 70 percent. In some such embodiments, or in other embodiments, Rpi is greater than 85, 90, 95, 96, 97, 98, or 99 percent.

Average (mean over wavelength range) values for Rs(0,0) and Rp(0,0) (expressed as a fraction) for various wavelength ranges are provided in the table below for a numerically modeled multilayer optical film having the layer thickness profile of FIG. 2 and the refractive indices of FIG. 3.

| Wavelength Range (nm) | Rs(0, 0) | Rp(0, 0) |
|---|---|---|
| 420-680 | 0.09 | 0.50 |
| 700-880 | 0.23 | 0.48 |
| 880-920 | 0.53 | 0.98 |
| 900-1300 | 0.60 | 1.00 |
| 1000-1200 | 0.62 | 1.00 |

Figure 6:
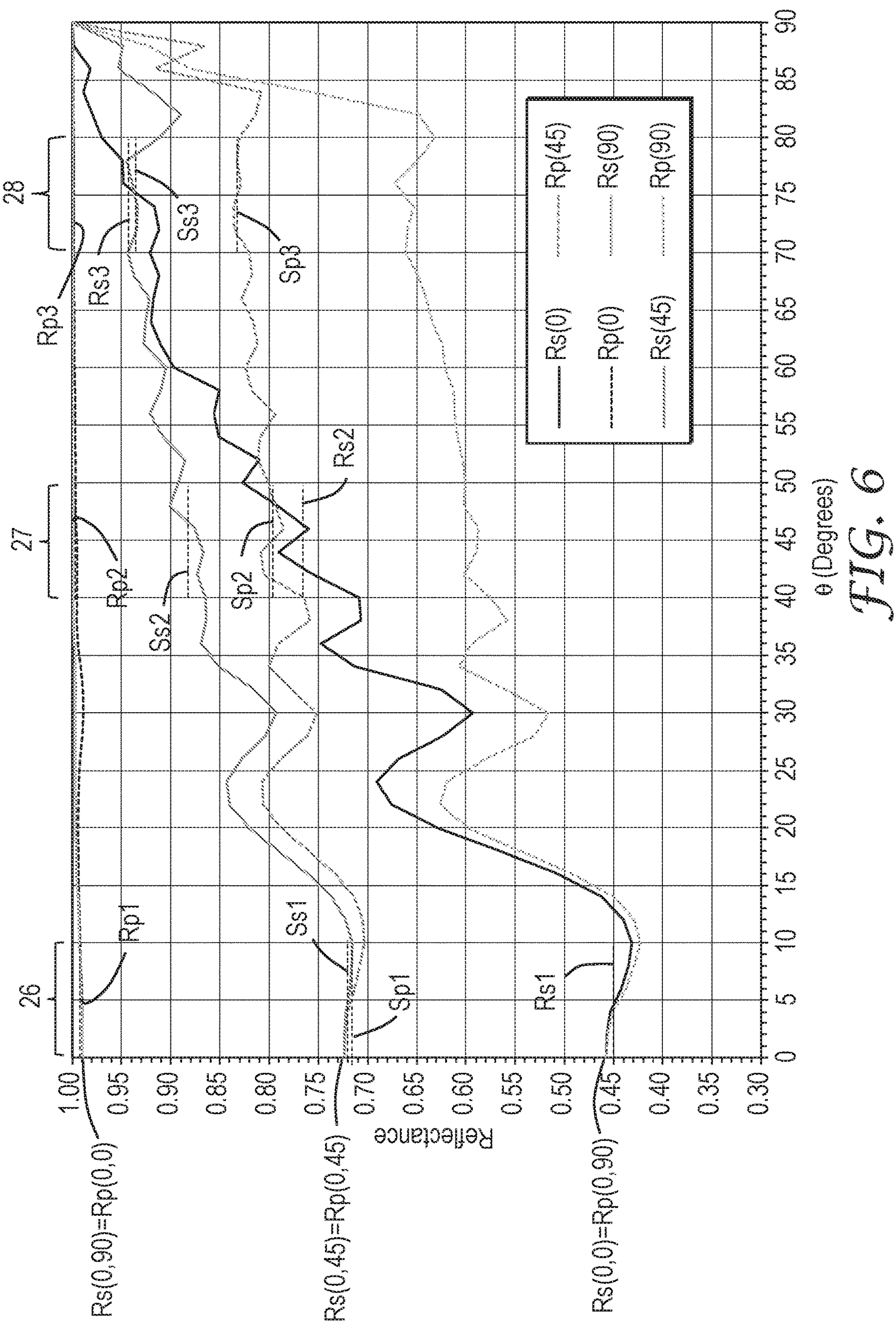
FIG. 6 is a plot of reflectance versus incident angle for a multilayer optical film and for a wavelength in an infrared wavelength range, according to some embodiments.

FIG. 6 is a plot of reflectance versus incident angle for an exemplary multilayer optical film and for a wavelength (e.g., 905 nm) in an infrared wavelength range (e.g., from about 700 nm to about 1400 nm or from about 900 nm to about 1300 nm). The notation Rp(φ) and Rs(φ) refers to the reflectance for p- and s-polarization states for an incident plane at an angle φ relative to the x-direction. The angle φ is 0, 45, or 90 degrees in FIG. 6. Average reflectances for p- and s-polarizations states Rp1, Rp2, Rp3 and Rs1, Rs2, Rs3 for incident angle ranges 26, 27, and 28 and for an angle φ of zero degrees are indicated. In some embodiments, Rs3>Rs2>Rs1. In some such embodiments, or in other embodiments, Rp1>Rs1 and Rp2>Rs2. In some such embodiments, or in other embodiments, Rp3>Rs3. In some such embodiments, or in other embodiments, Rs3 is greater than Rs1 by at least 20 percent (i.e., when Rs1 and Rs3 are expressed as a percent, Rs3 can be greater than Rs1+20%). In some such embodiments, or in other embodiments, Rs3 is greater than Rs1 by at least 25, 30, 35, 40, or 45 percent. Rs3 can be greater than Rs1 by up to 70, 75, 60, or 55 percent, for example. In some embodiments, Rs1 is in a range of 30 to 60 percent or 40 to 50 percent. In some such embodiments, or in other embodiments, Rs3 is in a range of 80 to 100 percent or 90 to 99 percent. In some such embodiments, or in other embodiments, Rs2−Rs1 and Rs3−Rs2 are each at least 15 or 20 percent. In some such embodiments or in other embodiments, a magnitude of a maximum difference between Rp1, Rp2 and Rp3 is less than about 20, 15, 10, 5, 4, 3, 2, or 1 percent. In some such embodiments or in other embodiments, each of Rp1, Rp2 and Rp3 is greater than about 90, 95, 96, or 97 percent.

Average reflectances for p- and s-polarizations states Sp1, Sp2, Sp3 and Ss1, Ss2, Ss3 for incident angle ranges 26, 27, and 28 and for an angle φ of 45 degrees are indicated in FIG. 6. In some embodiments, Ss3>Ss2>Ss1. In some such embodiments, or in other embodiments, Ss2/Ss1>Sp2/Sp1 and/or Ss3/Ss1>Sp3/Sp1. In some embodiments, Ss2/Ss1>1.05 Sp2/Sp1. In some embodiments, Ss2/Sp2>Ss1/Sp1. In some embodiments, Ss2/Sp2>1.05 Ss1/Sp1. In some embodiments, Ss2>Ss1. In some embodiments, Ss2 is greater than Ss1 by at least 10 percent or by at least 15 percent. Ss2 can be greater than Ss1 by up to 30, 25, or 20 percent, for example. In some embodiments, Ss2 is greater than Sp2 by at least 5 percent or by at least 10 percent. Ss2 can be greater than Sp2 by up to 25, 20, or 15 percent, for example. In some embodiments, Ss1 is in a range of 50 to 88 percent and Ss3 is in a range of 88 to 100 percent. In some such embodiments, or in other embodiments, Ss2−Ss1 and Ss3−Ss2 are each greater than about 2, 3, 4, or 5 percent. In some such embodiments, or in other embodiments, Sp1 is greater than 60 percent, Sp3 is less than 90 percent, and Sp3−Sp1 is greater than 2, 4, 6, or 8 percent.

Average (mean over incident angle range) values for Rs(φ) and Rp(φ) (expressed as a fraction) for various angles φ (in degrees), for various incident angle ranges, and for a wavelength of 905 nm are provided in the table below for a numerically modeled multilayer optical film having the layer thickness profile of FIG. 2 and the refractive indices of FIG. 3.

| Incident angle range (degrees) | Rs (0) | Rp (0) | Rs (45) | Rp (45) | Rs (90) | Rp (90) |
|---|---|---|---|---|---|---|
| 0-10 | 0.45 | 0.99 | 0.72 | 0.72 | 0.99 | 0.44 |
| 40-50 | 0.77 | 1.00 | 0.88 | 0.79 | 1.00 | 0.59 |
| 70-80 | 0.94 | 1.00 | 0.93 | 0.83 | 1.00 | 0.65 |

In some embodiments, a multilayer optical film 300 includes a plurality of optical repeat units 10 where each of the optical repeat units 10 includes at least one polymeric A layer, at least two polymeric B layers, and at least one polymeric C layer and where each pair of adjacent A and C layers having at least one of the at least two B layers disposed therebetween. A total number of the A, B and C layers in the plurality of optical repeat units can be greater than about 400 nm or can be in any range described elsewhere herein. In some embodiments, each of the A, B and C layers has an average thickness of less than about 500 nm or in another range described elsewhere herein, such that for an incident light 20 propagating in an incident plane 21 that makes an angle φ of less than about 10 with an in-plane first direction (e.g., x-direction) of the optical film 300, a visible wavelength range 22 extending from about 420 nm to about 680 nm, and an infrared wavelength range 23 extending from about 900 nm to about 1300 nm: for an incident angle θ of less than about 10 degrees and for p- and s-polarizations 24 and 25, the plurality of optical repeat units has respective average optical reflectances Rpv and Rsv in the visible wavelength range and respective average optical reflectances Rpi and Rsi in the infrared wavelength range, where Rpi/Rpv<Rsi/Rsv; and for the s-polarization, for at least one wavelength 29 in the infrared wavelength range 23, and for incident angle first (26), second (27) and third (28) ranges that are at least 10 degrees apart and where each of the incident angle ranges is at least 5 degrees wide and the incident angles in the second range are greater than the incident angles in the first range and smaller than the incident angles in the third range, the plurality of optical repeat units has respective average optical reflectances Rs1, Rs2 and Rs3, where Rs3>Rs2>Rs1. The at least one wavelength can be or include a wavelength of about 905 nm, for example. The angle φ can be less than about or 8, or 6, or 4, or 2, or 1 degrees. The angle θ can be less than about or 8, or 6, or 4, or 2, or 1 degrees. For example, the angle φ and/or the angle θ can be zero degrees. The incident angle first (26), second (27) and third (28) ranges can be at least 15, or 20, or 25, or 30 degrees apart. Each of the incident angle ranges can be least 6, or 7, or 8, or 9, or 10 degrees wide. The in-plane first direction may be the in-plane direction along which the A layers have a largest refractive index and/or the in-plane direction such that the optical film has a maximum reflectance in a visible or infrared wavelength range for substantially normally incident light polarized along the in-plane direction. The in-plane first direction is typically parallel or approximately parallel to the direction along which a magnitude of a difference between refractive indices of the A and C layers is largest for at least one wavelength in a visible wavelength range.

In some embodiments, for the at least one wavelength 29, for the p-polarization and for each of the incident angle first (26), second (27) and third (28) ranges, the plurality of optical repeat units has an average optical reflectance of greater than about 70, 75, 80, 85, 90, 95, 96, 97, 98, or 99 percent. In some embodiments, for the at least one wavelength, for the p-polarization 24 and for the incident angle first and second ranges, the plurality of optical repeat units 10 has respective average optical reflectances Rp1 and Rp2, where Rp1>Rs1 and Rp2>Rs2. In some embodiments, for the at least one wavelength 29 in the infrared wavelength range 23 and for the incident angle first (26), second (27) and third (28) ranges, the plurality of optical repeat units 10 has respective average optical reflectances Rp1, Rp2 and Rp3 for the p-polarization, where a magnitude of a maximum difference between Rp1, Rp2 and Rp3 is less than about 20, 15, 10, 5, 4, 3, 2, 1, or 0.5 percent. Here, the average optical reflectance can be understood to be the average (unweighted mean) over incident angles in the incident angle range and over the at least one wavelength if the at least one wavelength includes more than one wavelength.

In some embodiments, a multilayer optical film 300 includes a plurality of optical repeat units 10 as describe elsewhere herein, such that for an incident light 20 propagating in an incident plane 21 that makes an angle φ of less than about 10 degrees (or in a range described elsewhere herein) with an in-plane first direction (e.g., x-direction) of the optical film: for a visible wavelength range 22 extending from about 420 nm to about 680 nm, and for an incident angle θ of less than about 10 degrees (or in a range described elsewhere herein), the plurality of optical repeat units has respective average optical reflectances Rpv and Rsv for respective p- and s-polarizations 24 and 25, where Rpv/Rsv≥2 (or in a range described elsewhere herein); and for at least one wavelength 29 in an infrared wavelength range 23 extending from about 900 nm to about 1300 nm, and for incident angle first (26), second (27) and third (28) ranges that are at least 10 degrees apart (or by an amount in a range described elsewhere herein) and where each of the incident angle ranges is at least 5 degrees wide (or in a range described elsewhere herein) and the incident angles in the second range are greater than the incident angles in the first range and smaller than the incident angles in the third range, the plurality of optical repeat units 10 has respective average optical reflectances Rs1, Rs2 and Rs3 for the s-polarization and respective average optical reflectances Rp1, Rp2 and Rp3 for the p-polarization, where: a magnitude of a maximum difference between Rp1, Rp2 and Rp3 is less than about 20% (or in any range described elsewhere herein); Rs3>Rs2>Rs1; and Rs3 is greater than Rs1 by at least 20% (or in any range described elsewhere herein). In some embodiments, for the incident angle θ of less than about 10 degrees and for the p- and s-polarizations 24 and 25, the plurality of optical repeat units has respective average optical reflectances Rpi and Rsi in the infrared wavelength range 23, where Rpi/Rpv<Rsi/Rsv.

In some embodiments, a multilayer optical film 300 includes a plurality of optical repeat units 10 numbering at least 50 (or in a range described elsewhere herein) in total, where each of the optical repeat units includes at least four individual layers (e.g., A, B, C, B), where two of the individual layers (e.g., C, C) in the at least four individual layers are substantially optically isotropic and have smaller average thicknesses than at least two other of the individual layers (e.g., A, B) in the at least four individual layers; and one of the individual layers (e.g., A) in the at least four individual layers has indices of refraction A(nx) and A(ny) along respective in-plane orthogonal x- and y-directions, where for at least one wavelength 30 (e.g., about 630 nm) in a visible wavelength range 22 extending from about 420 nm to about 680 nm, A(nx) is greater than A(ny) by at least 0.12 (or in a range described elsewhere herein); such that for an incident light 31 propagating in an incident plane 32 that makes an angle φ of between about 30 degrees and about 60 degrees with the in-plane x-direction of the optical film, and incident angle first (26), second (27) and third (28) ranges that are at least 10 degrees apart (or in a range described elsewhere herein) and where each of the incident angle ranges is at least 5 degrees wide (or in a range described elsewhere herein) and the incident angles in the second range 27 are greater than the incident angles in the first range 26 and smaller than the incident angles in the third range 28, and for at least one wavelength 29 in an infrared wavelength range 23 extending from about 900 nm to about 1300 nm, the plurality of optical repeat units 19 has respective average optical reflectances Ss1, Ss2 and Ss3 when the incident light is s-polarized (s-polarization 34), where Ss3>Ss2>Ss1. The angle φ can be between about 40 degrees and about 50 degrees. The angle φ can be about 45 degrees, for example.

In some embodiments, for the incident light 31 propagating in the incident plane 32 that makes the angle φ of between about 30 degrees and about 60 degrees with the x-direction, and the incident angle first (26) and third (28) ranges, and for the at least one wavelength 29 in the infrared wavelength range 23, the plurality of optical repeat units 10 has respective average optical reflectances Sp1 and Sp3 when the incident light is p-polarized (see, e.g., p-polarization 33 depicted in FIG. 4C), where Sp3>Sp1.

In some embodiments, a multilayer optical film 300 includes a plurality of optical repeat units 10, as described further elsewhere herein, where each of the optical repeat units includes at least one polymeric A layer, at least two polymeric B layers, and at least one polymeric C layer, and where each pair of adjacent A and C layers having at least one of the at least two B layers disposed therebetween. The A layers can have indices of refraction A(nx) and A(ny) along respective in-plane orthogonal x- and y-directions, where for at least one wavelength 30 in a visible wavelength range 22 extending from about 420 nm to about 680 nm, A(nx) is greater than A(ny) by at least 0.12 (or by an amount in a range described elsewhere herein); such that for an incident light 31 propagating in an incident plane 32 that makes an angle φ of between about 30 degrees and about 60 degrees (or in a range described elsewhere herein) with the in-plane x-direction of the optical film, and incident angle first (26) and second (28) ranges that are at least 30 degrees apart (or by an amount in a range described elsewhere herein) and where each of the incident angle ranges is at least 5 degrees wide (or by an amount in a range described elsewhere herein) and the incident angles in the second range are greater than the incident angles in the first range, and for at least one wavelength 29 in an infrared wavelength range 23 extending from about 900 nm to about 1300 nm, the plurality of optical repeat units has respective average optical reflectances Ss1 and Ss2 when the incident light is s-polarized (see, e.g., s-polarization 34 depicted in FIG. 4C), and respective average optical reflectances Sp1 and Sp2 when the incident light is p-polarized (see, e.g., p-polarization 33 depicted in FIG. 4C). In some embodiments, Ss2/Ss1>Sp2/Sp1. In some embodiments, Ss2/Ss1>1.05 Sp2/Sp1. In some embodiments, Ss2/Sp2>Ss1/Sp1. In some embodiments, Ss2/Sp2>1.05 Ss1/Sp1. In some embodiments, Ss2>Ss1. In some embodiments, Ss2 is greater than Ss1 by at least 10 percent. In some embodiments, Ss2 is greater than Sp2 by at least 5 percent. Ss1, Ss2, Sp1, Sp2, and their ratios, can be in any of the ranges described elsewhere herein. The incident angle first (26) and second (28) ranges of FIG. 8 may correspond to the incident angle first (26) and third (28) ranges of FIG. 6, for example.

In some embodiments, for the incident light 31 propagating in the incident plane 32 and for the incident angle first range 26 and the visible wavelength range 22, the plurality of optical repeat units has average optical reflectances Ps1 and Pp1 for respective s- and p-polarizations. In some embodiments, each of Ps1 and Ps2 is greater than about 5% and less than about 45%. In some such embodiments, or in other embodiments, each of Ps1 and Ps2 is greater than about 10% or greater than about 15%. In some such embodiments, or in other embodiments, each of Ps1 and Ps2 is less than about 40%, or less than about 35%, or less than about 30%.

Figure 7:
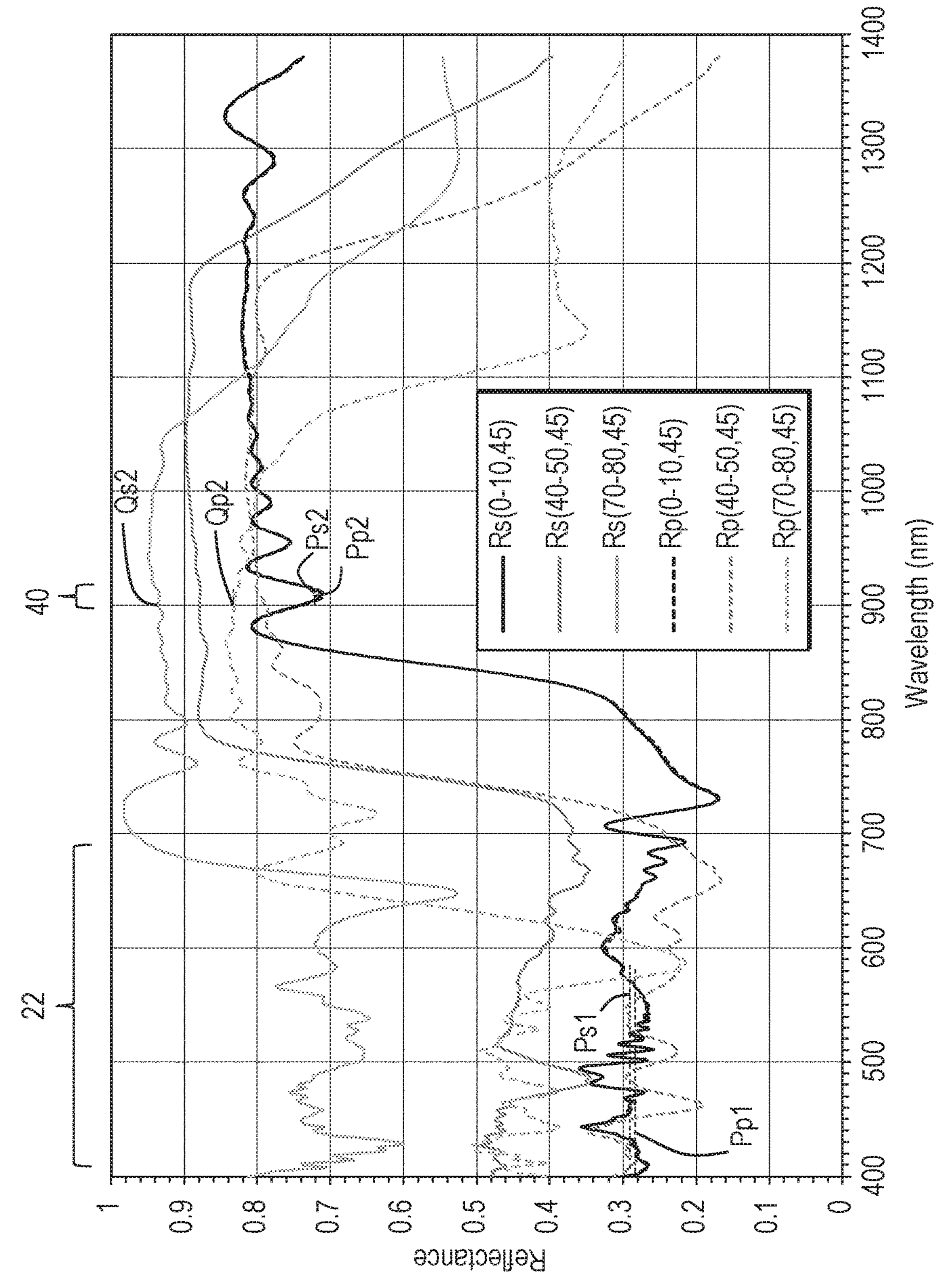
FIG. 7 is a plot of reflectance versus wavelength for a multilayer optical film and for incident light in various ranges of incident angle in an incident plane, according to some embodiments.

FIG. 7 is a plot of reflectance versus wavelength for an exemplary multilayer optical film and for an incident plane making an angle φ with an x-direction (e.g., direction along a maximum index of refraction of the A layers). In the illustrated embodiment, the angle φ is 45 degrees. 10. In some embodiments, for the incident light 31 propagating in the incident plane 32, for the wavelength range 40 that is at least 5 nm wide and is disposed between about 700 nm and about 1400 nm, and for the incident angle first and second ranges, the plurality of optical repeat units has respective average optical reflectances Ps2 and Qs2 for one of the s- and p-polarizations, and respective average optical reflectances Pp2 and Qp2 for the other one of the s- and p-polarizations, where Qs2−Ps2>Qp2−Pp2. The wavelength range 40 can be from about 900 nm to about 910 nm, for example. The one of the s- and p-polarizations can be the s-polarization and the other one of the s- and p-polarizations can be the p-polarization, for example. In some embodiments, each of Ps1 and Ps2 greater than about 5%, or greater than about 10%, or greater than about 15%. In some such embodiments, each of Ps1 and Ps2 is less than about 45%, or less than about 40%, or less than about 35%, or less than about 30%. In some embodiments, Ps1 is in a range of about 20 to 40 percent or about 25 to 35 percent. In some such embodiments, or in other embodiments, Pp1 is in a range of about 20 to 40 percent or about 25 to 35 percent. In some such embodiments, or in other embodiments, Qs2 is in a range of about 80 to 100 percent or about 85 to 98 percent. In some such embodiments, or in other embodiments, Ps2 is in a range of about 50 to 90 percent or about 60 to 80 percent. In some such embodiments, or in other embodiments, Qp2 is in a range of about 60 to 100 percent or about 70 to 95 percent. In some such embodiments, or in other embodiments, Pp2 is in a range of about 50 to 90 percent or about 60 to 80 percent.

Average (mean over wavelength and incident angle ranges) values for Rs(θ, φ) and Rp(θ, φ) (expressed as a fraction) for various angles φ=45 degrees, for various ranges of the incident angle θ (in degrees), and for various wavelength ranges are provided in the table below for a numerically modeled multilayer optical film having the layer thickness profile of FIG. 2 and the refractive indices of FIG. 3.

| Wavelength range (nm) | Rs (0-10, 45) | Rs (40-50, 45) | Rs (70-80, 45) | Rp (0-10, 45) | Rp (40-50, 45) | Rp (70-80, 45) |
|---|---|---|---|---|---|---|
| 420-680 | 0.29 | 0.42 | 0.69 | 0.29 | 0.25 | 0.46 |
| 900-910 | 0.72 | 0.88 | 0.93 | 0.72 | 0.79 | 0.83 |
| 900-1300 | 0.80 | 0.85 | 0.79 | 0.80 | 0.73 | 0.58 |

In some embodiments, a multilayer optical film 300 includes a plurality of optical repeat units (10), as described further elsewhere herein, such that for an incident light 31 propagating in an incident plane 32 that makes an angle φ of between about 30 degrees and about 60 degrees with the in-plane x-direction (e.g., principal axis of the index of refraction of the A layers) of the optical film, and for incident angle first (26) and second (28) ranges as described elsewhere herein: for the incident angle first range and the visible wavelength range 22, the plurality of optical repeat units 10 has average optical reflectances Ps1 and Pp1 for the respective s- and p-polarization, each of Ps1 and Ps2 greater than about 5% and less than about 45%; and for an infrared wavelength range 40 as described elsewhere herein, and for the incident angle first (26) and second (28) ranges, the plurality of optical repeat units 10 has respective average optical reflectances Ps2 and Qs2 for one of the s- and p-polarizations, and respective average optical reflectances Pp2 and Qp2 for the other one of the s- and p-polarizations, where Qs2−Ps2>Qp2−Pp2. Ps1, Pp1, Qs2, Ps2, Qp2, and Pp2 can be in any of the ranges described elsewhere herein.

Figure 8:
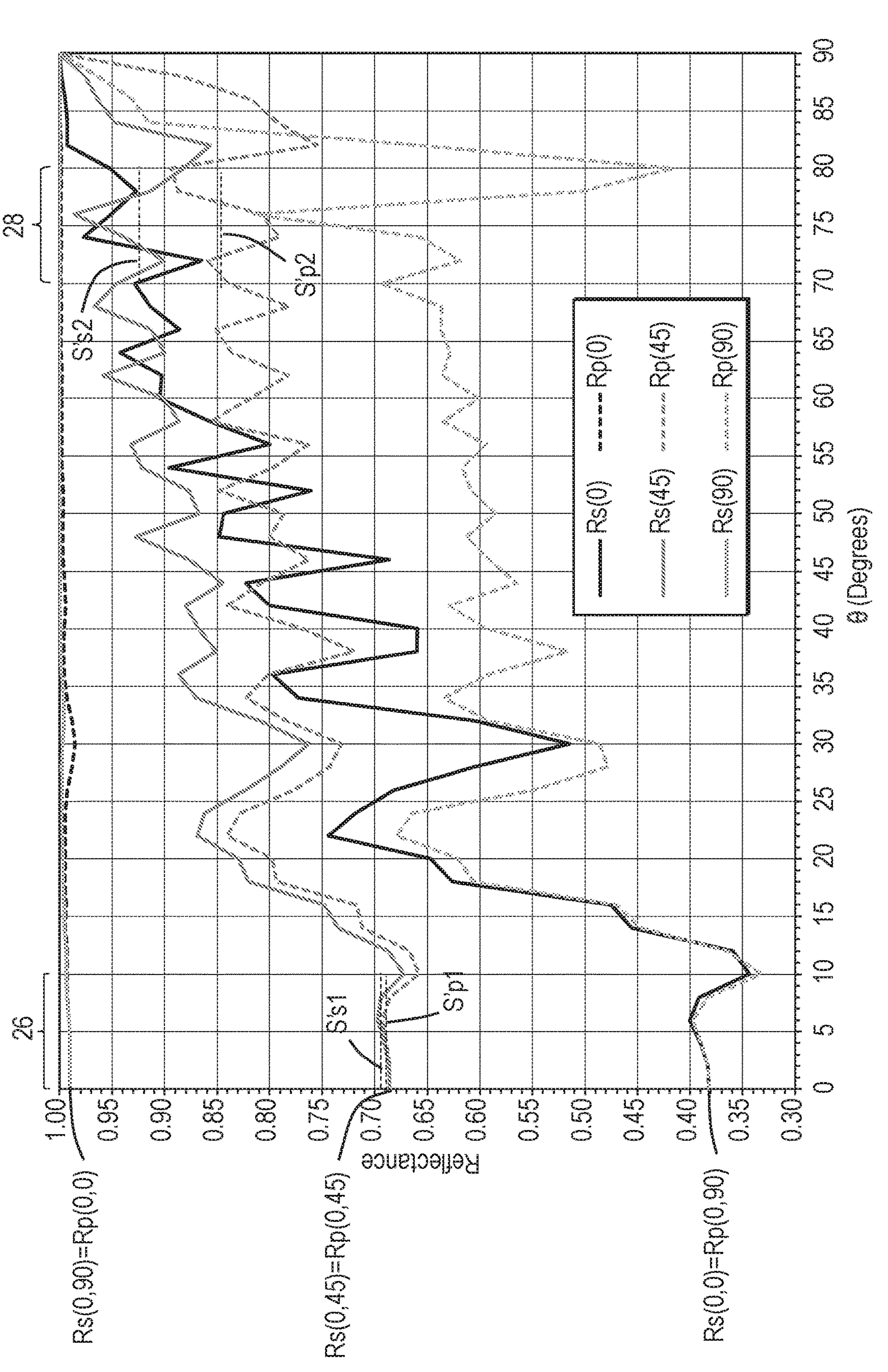
FIG. 8 is a plot of reflectance averaged over an infrared wavelength range versus incident angle for a multilayer optical film, according to some embodiments.

FIG. 8 is a plot of reflectance averaged over an infrared wavelength range (e.g., 900 to 910 nm) versus incident angle for an exemplary multilayer optical film. In some embodiments, for the incident light 31 propagating in the incident plane 32, for the wavelength range 40 (see, e.g., FIG. 7), and for the incident angle first (26) and second (28) ranges, the plurality of optical repeat units 10 has respective average optical reflectances S's1 and S's2 when the incident light is s-polarized, and respective average optical reflectances S'p1 and S'p2 when the incident light is p-polarized. In some embodiments, S's2/S's1>S'p2/S'p1. In some embodiments, S's2/S's1 is greater than 1.02, 1.04, or 1.06 times S'p2/S'p1. S's2/S's1 can be up to 1.5, 1.4, 1.3, 1.2, or 1.1 times S'p2/S'p1, for example. In some embodiments, S's1 is greater than 50 percent, S's2−S's1 is greater than 10 percent, and S's2 is less than 100 percent. In some embodiments, S's1 is in a range of 60 to 80 percent and S's2 is in a range of 80 to 100 percent. In some such embodiments, or in other embodiments, S'p1 is in a range of 60 to 80 percent and S'p2 is in a range of 75 to 95 percent.

Average (mean over incident angle and wavelength ranges) values for Rs(φ) and Rp(φ) (expressed as a fraction) for various angles φ (in degrees), for various incident angle ranges, and for a wavelength range of 900-910 nm are provided in the table below for a numerically modeled multilayer optical film having the layer thickness profile of FIG. 2 and the refractive indices of FIG. 3.

| Incident angle range (degrees) | Rs (0) | Rp (0) | Rs (45) | Rp (45) | Rs (90) | Rp (90) |
|---|---|---|---|---|---|---|
| 0-10 | 0.38 | 0.99 | 0.69 | 0.68 | 0.99 | 0.38 |
| 40-50 | 0.78 | 1.00 | 0.88 | 0.79 | 1.00 | 0.60 |
| 70-80 | 0.93 | 1.00 | 0.93 | 0.85 | 1.00 | 0.62 |

In some embodiments, a multilayer optical film 300 includes a plurality of optical repeat units 10 as described elsewhere herein, such that for an incident light 31 propagating in an incident plane 32 as described elsewhere herein, and the incident angle first (26) and second (28) ranges, and for the infrared wavelength range 40, the plurality of optical repeat units 10 has respective average optical reflectances S's1 and S's2 when the incident light is s-polarized (34), and respective average optical reflectances S'p1 and S'p2 when the incident light is p-polarized (33), where S's2/S's1>S'p2/S'p1 or in another range described elsewhere herein. S's2, S's1, S'p2, S'p1 can be in any of the ranges described elsewhere herein. In some embodiments, for the incident light 31 propagating in the incident plane 32 and for the incident angle first range 26 and the visible wavelength range 22, the plurality of optical repeat units 10 has average optical reflectances Ps1 and Pp1 for respective s- and p-polarizations 34 and 33, where each of Ps1 and Ps2 greater than about 5% and less than about 45%. Ps1 and Ps2 can be in any range described elsewhere herein. In some embodiments, for the incident light 31 propagating in the incident plane 32, for the wavelength range 40, and for the incident angle first (26) and second (28) ranges, the plurality of optical repeat units has respective average optical reflectances Ps2 and Qs2 for one of the s- and p-polarizations 34 and 33, and respective average optical reflectances Pp2 and Qp2 for the other one of the s- and p-polarizations, where $Qs2-Ps2>Qp2-Pp2$. Qs2, Ps2, Qp2, Pp2 can be in any range described elsewhere herein.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially" with reference to a property or characteristic is not otherwise clear to one of ordinary skill in the art in the context in which it is used and described in the present description and when it would be clear to one of ordinary skill in the art what is meant by an opposite of that property or characteristic, the term "substantially" will be understood to mean that the property or characteristic is exhibited to a greater extent than the opposite of that property or characteristic is exhibited.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A multilayer optical film comprising a plurality of optical repeat units, each of the optical repeat units comprising at least one polymeric A layer, at least two polymeric B layers, and at least one polymeric C layer, each pair of adjacent A and C layers having at least one of the at least two B layers disposed therebetween, a total number of the A, B and C layers in the plurality of optical repeat units greater than about 400, each of the A, B and C layers having an average thickness of less than about 500 nm, such that for an incident light propagating in an incident plane that makes an angle of less than about 10 degrees with an in-plane first direction of the optical film, a visible wavelength range extending from about 420 nm to about 680 nm, and an infrared wavelength range extending from about 900 nm to about 1300 nm:

for an incident angle of less than about 10 degrees and for p- and s-polarizations, the plurality of optical repeat units has respective average optical reflectances Rpv and Rsv in the visible wavelength range and respective average optical reflectances Rpi and Rsi in the infrared wavelength range, $Rpi/Rpv<Rsi/Rsv$; and for the s-polarization, for at least one wavelength in the infrared wavelength range, and for incident angle first, second and third ranges that are at least 10 degrees apart and where each of the incident angle ranges is at least 5 degrees wide and the incident angles in the second range are greater than the incident angles in the first range and smaller than the incident angles in the third range, the plurality of optical repeat units has respective average optical reflectances Rs1, Rs2 and Rs3, $Rs3>Rs2>Rs1$.

2. The multilayer optical film of claim 1, wherein for the at least one wavelength, for the p-polarization and for each of the incident angle first, second and third ranges, the plurality of optical repeat units has an average optical reflectance of greater than about 70%.

3. The multilayer optical film of claim 1, wherein for the at least one wavelength, for the p-polarization and for the incident angle first and second ranges, the plurality of optical repeat units has respective average optical reflectances Rp1 and Rp2, $Rp1>Rs1$, $Rp2>Rs2$.

4. The multilayer optical film of claim 1, wherein for the at least one wavelength in the infrared wavelength range and for the incident angle first, second and third ranges, the plurality of optical repeat units has respective average optical reflectances Rp1, Rp2 and Rp3 for the p-polarization, a magnitude of a maximum difference between Rp1, Rp2 and Rp 3 being less than about 20%.

5. The multilayer optical film of claim 1, wherein the plurality of optical repeat units is disposed between first and second skin layers, each of the first and second skin layers having an average thickness of greater than about 500 nm.

6. The multilayer optical film of claim 1, wherein for each of the optical repeat units, the average thickness of each of the at least two polymeric B layers is less than the average thickness of the at least one polymeric A layer and the average thickness of each of the at least one polymeric C layer.

7. The multilayer optical film of claim 1, wherein $Rpv/Rsv\geq 2$.

* * * * *